United States Patent [19]

Rotter et al.

[11] Patent Number: 5,351,664
[45] Date of Patent: Oct. 4, 1994

[54] OIL COOLING DEVICE

[75] Inventors: Terrence M. Rotter, Sheboygan Falls; Victor Van Dyke, Kohler, both of Wis.

[73] Assignee: Kohler Co., Kohler, Wis.

[21] Appl. No.: 49,047

[22] Filed: Apr. 16, 1993

[51] Int. Cl.[5] .............................................. F01M 5/00
[52] U.S. Cl. ................................ 123/196 AB; 165/916; 184/104.3
[58] Field of Search .............. 123/196 AB; 184/104.3; 165/916

[56] References Cited

U.S. PATENT DOCUMENTS

| | | | |
|---|---|---|---|
| 1,963,945 | 6/1934 | Lyman et al. | 210/169 |
| 2,358,933 | 9/1944 | Lance | 210/122.5 |
| 2,392,548 | 1/1946 | Pogue | 196/16 |
| 2,893,514 | 7/1959 | Badertscher et al. | 184/6 |
| 3,223,197 | 12/1965 | Conover et al. | 184/6 |
| 4,193,442 | 3/1980 | Vian | 184/104.3 |
| 4,324,213 | 4/1982 | Kasting et al. | 123/196 |
| 4,337,737 | 7/1982 | Pechner | 123/196 |
| 4,423,708 | 1/1984 | Sweetland | 123/196 |
| 4,426,965 | 1/1984 | Patel | 123/196 |
| 4,878,536 | 11/1989 | Stenlund | 165/119 |
| 5,014,775 | 5/1991 | Watanabe | 165/167 |
| 5,236,043 | 8/1993 | Armbruster et al. | 165/916 |

FOREIGN PATENT DOCUMENTS 63-54590  3/1988  Japan ................................ 165/916

*Primary Examiner*—E. Rollins Cross
*Assistant Examiner*—Erick Solis
*Attorney, Agent, or Firm*—Quarles & Brady

[57] ABSTRACT

An oil filtering and cooling device for use with an internal combustion engine is disclosed. It is composed of few components and easily fitted on or retrofitted to an internal combustion engine. In one embodiment, a pressure valve is employed to direct oil away from a cooling function yet allow for filtering thereof. The valve is a reed valve.

13 Claims, 3 Drawing Sheets

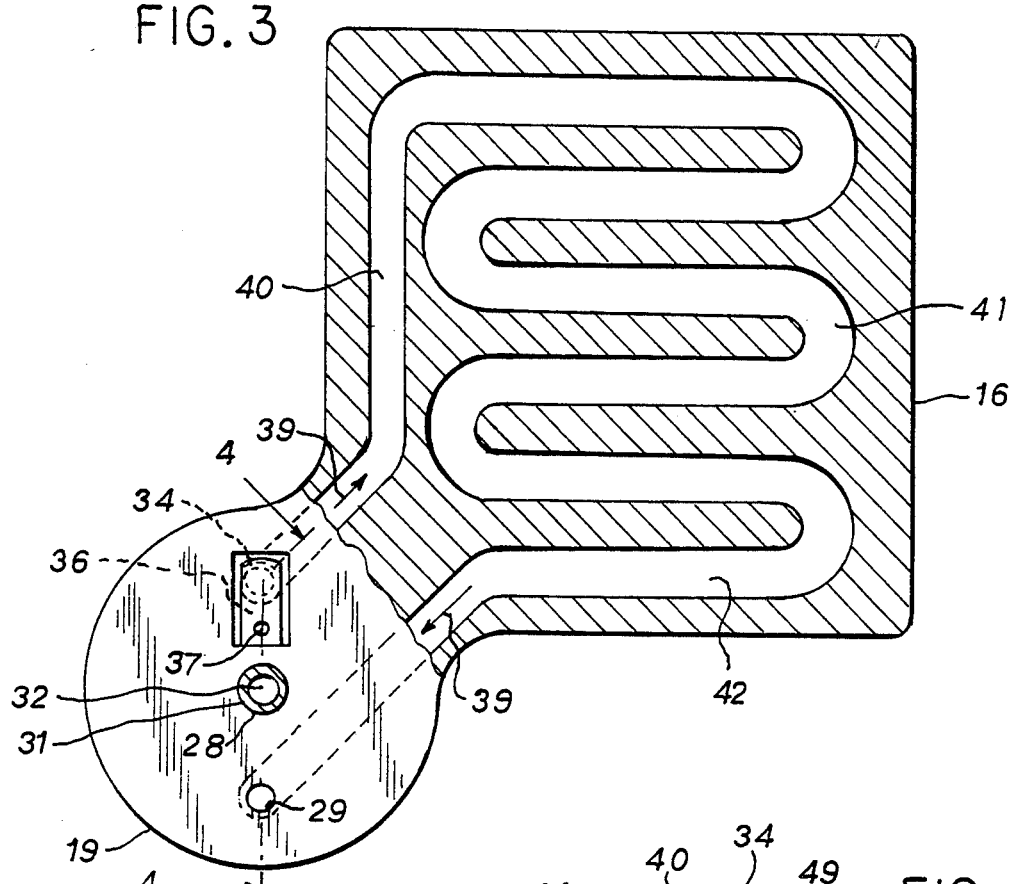
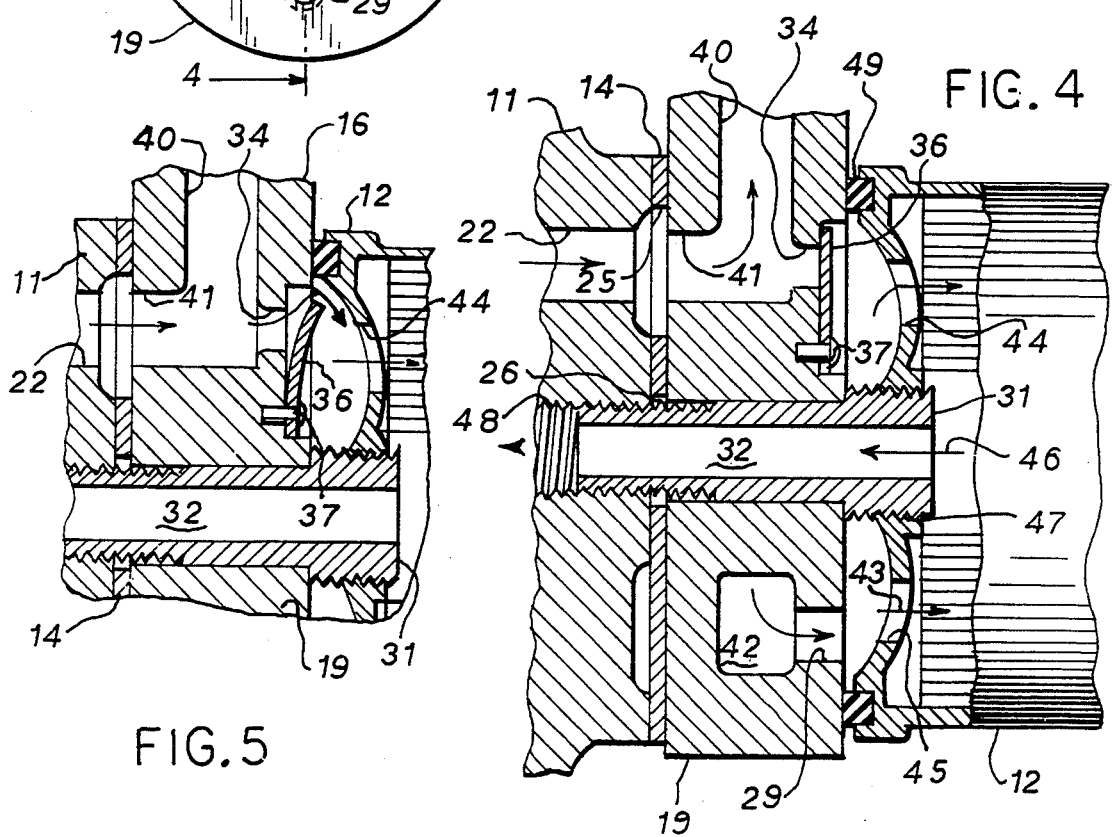

OIL COOLING DEVICE

BACKGROUND OF THE INVENTION

1. Field of the Invention

This invention relates primarily to devices which can cool oil for use with an internal combustion engine. More particularly, the invention relates to oil cooling devices of the foregoing type which operate in conjunction with oil filters.

2. Description of the Art

It is known in the art of internal combustion engines to employ oil cooling devices with oil filters. For example, this is shown in U.S. Pat. Nos. 2,893,514; 4,423,708; and 5,014,775. These systems utilize multicomponent devices which require specially designed oil filter housings.

It is also known to provide bypass valving in connection with certain oil cooling systems. This is indicated in the previously referred to U.S. Pat. Nos. 2,893,514 and 4,423,708, as well as U.S. Pat. No. 3,223,197. These systems not only bypass the cooling function, but also the filtering as well. This can be a problem when the oil is dirty.

Thus, it can be seen that a need exists for an improved oil cooling and filtering system.

SUMMARY OF THE INVENTION

In one aspect, the invention provides an oil cooling device for use with an internal combustion engine wherein an air coolable body member is adapted to be placed between an oil filter and a wall of an internal combustion engine. The body member includes a cooling section and a connecting section with the connecting section being for connection to the engine wall on one side and the oil filter on another side. There are fluid feed and return passages disposed in the connecting and cooling sections with the fluid feed passage adapted to be connected to an oil outlet port of the engine wall, and the return passage adapted to be connected to the oil filter.

In preferred form, the body is a unitary single piece construction, and the cooling section has externally extending fin members to permit the movement of cooling air thereover with at least one of said passages being serpentine in the cooling section.

In another form, the filter is provided, and there is a bypass port through a cooling body of the connecting section extending to permit, under certain oil pressure conditions, direct flow from the engine oil outlet port to the filter. There is also a pressure activated valve operatively associated with the bypass port to inhibit passage of lower pressure oil through the bypass port while permitting greater flow of oil through it when high pressure oil is present.

Also preferably, the valve is a reed valve attached to a side of the connecting section.

In another aspect, the body has a paddle shaped configuration, with the connecting section being in the shape of a paddle handle.

In yet another aspect, the device is connected between an oil filter and a wall of an internal combustion engine, and there is a direct line passage through the connecting section between the filter and engine intake port.

The objects of the invention therefore include:

a. providing an improved oil cooling device of the above kind which is air coolable;

b. providing an oil cooling device of the above kind which can be manufactured with a one piece housing;

c. providing an oil cooling device of the above kind which is easily placed in connection with an engine housing and an oil filter;

d. providing an oil cooling device of the above kind which can bypass a cooling function yet still provide a filtering function;

e. providing an oil cooling device of the above kind which can be easily retrofitted to an engine without modifications; and f. providing an oil cooling device of the above kind which can be easily molded using a variety of molding and casting methods.

These and still other objects and advantages of the invention will be apparent from the description which follows. In the detailed description below, the preferred embodiments of the invention will be described with reference to the accompanying drawings. These embodiments do not represent the full scope of the invention. Rather the invention may be employed in other embodiments. Reference should therefore be made to the claims herein for interpreting the breadth of the invention.

BRIEF DESCRIPTION OF THE DRAWINGS

FIG. 3 is a partial sectional view taken along lines 3—3 of FIG. 1;

FIG. 4 is a sectional view taken along lines 4—4 of FIG. 3;

FIG. 5 is a view similar to FIG. 4 showing a different mode of operation of a valve member.

DESCRIPTION OF THE PREFERRED EMBODIMENTS

Figure 1:
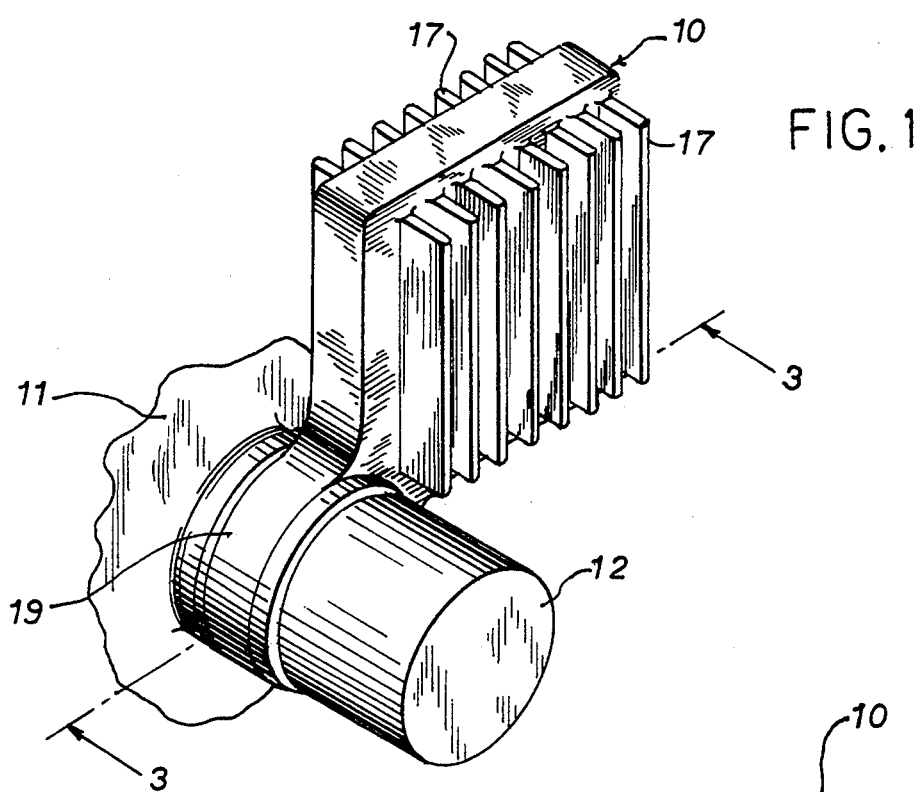
FIG. 1 is a perspective view showing an oil cooling and filtering device of the present invention in an assembled condition with an engine housing.
Figure 2:
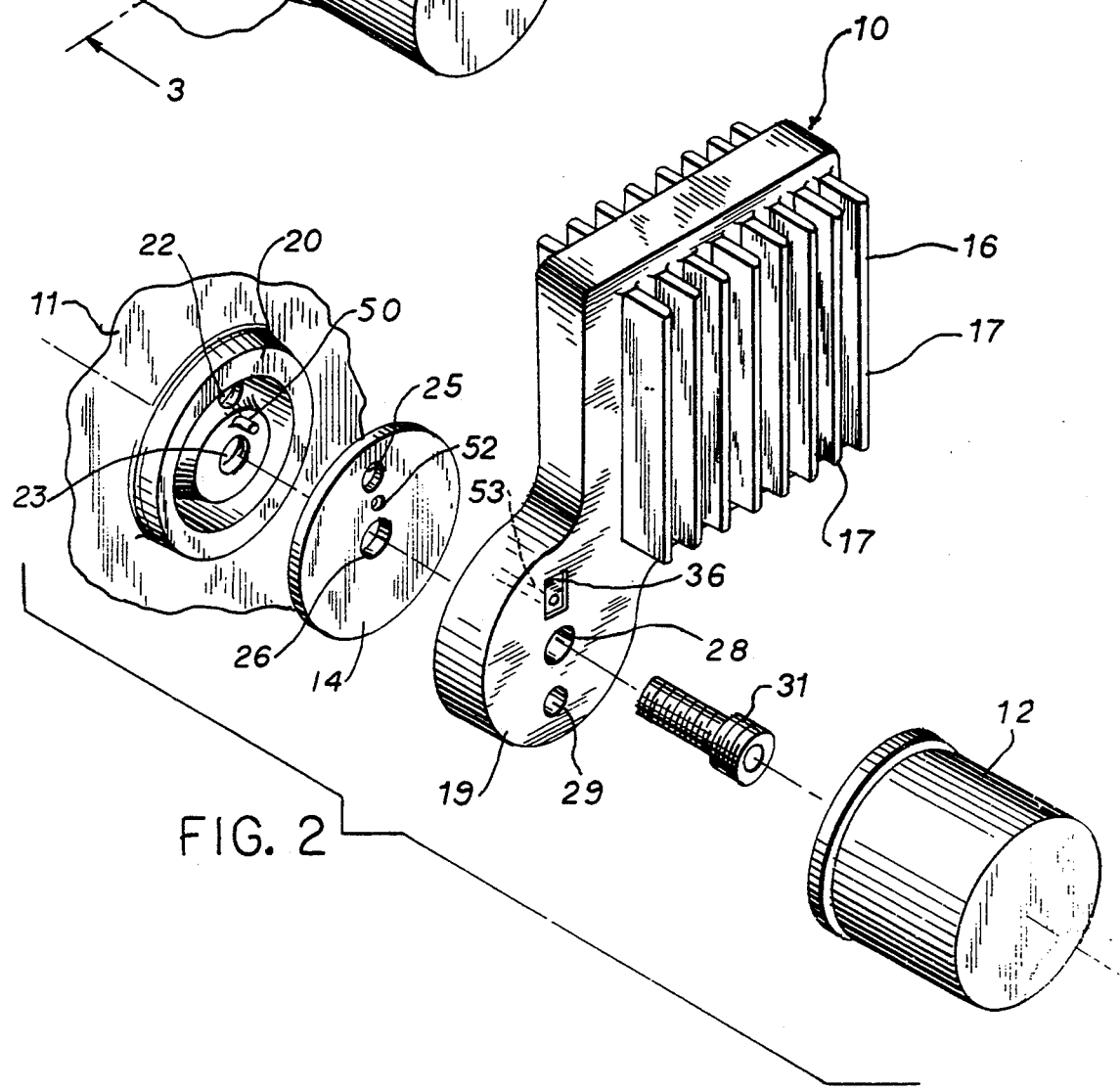
FIG. 2 is a exploded perspective view of the components shown in FIG. 1.

Referring to FIGS. 1 and 2, the cooling device generally 10 is shown in conjunction with an internal combustion engine housing 11 and an oil filter 12. It is seen that the oil cooling device 10 includes a cooling section 16 with spaced apart fins 17 and a connecting section 19 which is interconnected between the housing 11 and the oil filter 12. Engine housing 11 has the usual mounting pad 20 within which are provided an oil outlet port 22 and an oil intake port 23. A gasket 14 is provided between the mounting pad 20 and the connecting section 19. The gasket 14 has openings 25 and 26 for orientation with the respective oil outlet port 22 and oil intake port 23.

Referring specifically to FIGS. 2-4, oil from engine housing 11 will exit out of oil outlet port 22 and enter into a feed channel 40 which extends into the cooling section 16. This channel 40 has a port 41 (see FIG. 5) for communication with outlet port 22. The oil travels through the serpentine pathway 41 in the cooling section 16 (and is thereby cooled), and forms a part of the fluid feed passage 40 and a return passage 42. The normal flow of oil through the cooling section 16 is best seen by the directional arrows 39 in FIG. 3. Oil flows from the return passage 42 to the exit passage 29 (see FIG. 4) in the connection section 19 where it exits into oil filter 12 such as through the passage 45 as shown by the directional arrows 43. The filter itself is largely conventional except for its connection to the remainder of the device. After being filtered in the filter 12, the oil flows through a nipple 31 having a hollow passage 32 to directly return the oil to the engine housing 11 through the port 23. This is shown by the directional arrows 46.

It should be noted that the connecting section 19 of the oil cooling device 10 is connected to the engine housing 11 by means of the nipple 31 having threads 48 for engaging the housing, as well as threads 47 which engage the filter 12. Seal 49 is provided between the filter 12 and the connecting section 19.

Referring specifically to FIGS. 4 and 5, it will be seen that a reed type valve 36 is connected to the connecting section 19 such as by means of a fastener 37. Reed valve 36 is die cut from spring steel. The purpose of the reed valve 36 is to effect a bypass of the cooling section 16 under conditions of high oil pressure (e.g. when the oil is cold) so as to permit such oil to directly enter the filter 12. When low pressure exists (e.g. when the oil is hot), it is directed to the cooling section 16. This is illustrated in FIG. 4 where the reed valve 36 is in a closed position and would be the normal condition when an engine is warm and operating. As shown, under these conditions, oil cannot enter through the passage 34 and directly into the filter 12.

When the engine is in a cold state, it is undesirable to have the cold oil further cooled by having it go through the cooling section 16. When the cold oil enters the feed channel 40, the resistance of the cold oil in the serpentine path 41 provides a high resistance resulting in the high pressure oil forcing open the reed valve 36 resulting in the passage of oil through passage 34 and into the filter 12.

Figure 6:
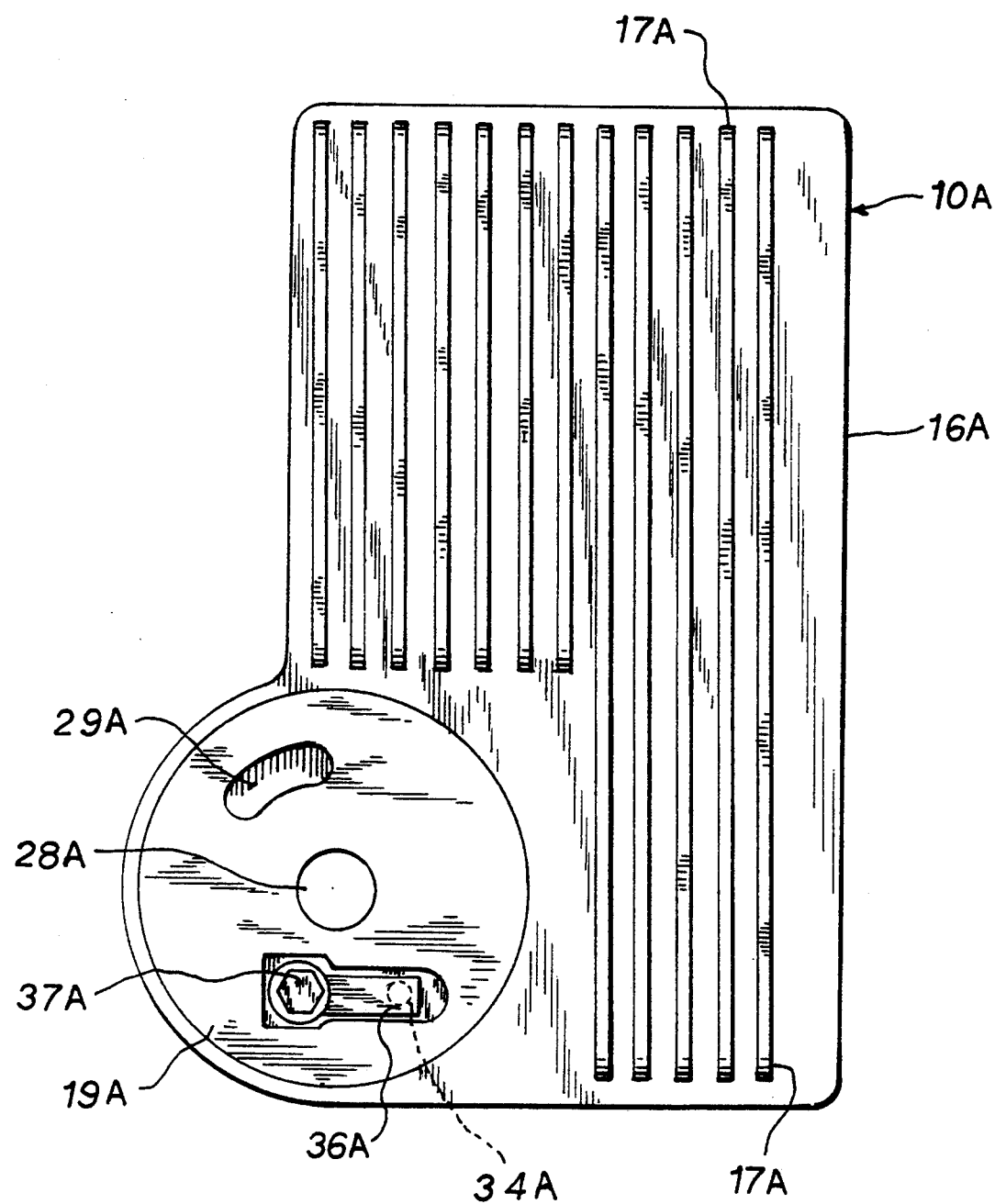
FIG. 6 is a view in side elevation showing an alternative embodiment.

Referring to the alternative embodiment generally 10A shown in FIG. 6, the same or similar components are designated with the same reference numerals as for the first embodiment except followed by the letter "A". One of the differences between the two embodiments is the location of the connecting section closer to the cooling section 16A. Another difference is the location of the passage 29A which returns cooled oil to the filter as well as the location of the reed valve 36A which is secured by the screw 37A. It should also be noted that passage 29A is of an arcuate configuration in contrast to the rounded passage 29.

Although not shown in FIG. 6, but as illustrated in FIG. 2, a hole 53 is provided through the connecting section 19A which affords not only a threaded passage for screw 37A but provides an orientation and nonrotation function with the projection 50 which extends from engine housing 11. A suitable hole 52 in gasket 14 accommodates projection 50.

An important aspect of the operation of the reed valve 36, is the fact that even though the high pressure cold oil is being bypassed from the cooling sections 16 and 16A, it still permits the oil to be filtered. This is a departure with the bypass valving systems in the prior art.

A distinct advantage of the oil cooling devices 10 and 10A are their simplicity and design having basically a cooling section 16 and a connecting section 19 which can all be molded from a single part. This is effected by using a lost foam casting method in which instance a sand core would be employed to form the internal passages such as channels 40–42. In come cases it may be necessary to cut open the cast part to remove all of the sand. Such openings can then be welded closed. This is still intended to be considered to be a unitary one piece part.

If desired, other casting procedures can be used such as investment or die casting. In the latter instance, the two halves would be fastened together with a seal therebetween. The preferred material for casting the oil cooling devices is aluminum. However, other heat conductive metals can be employed as well as heat conductive plastic materials.

Another advantage of devices 10 or 10A is the fact that by means of a connecting section they are directly connected to the oil outlet and inlet ports of an engine housing without requiring additional connecting tubing or piping. They are thus easily retrofitted to engine housings.

Another important feature is the fact that there are no additional cooling components required in the cooling section 16 which includes only a serpentine pathway.

Thus, the invention provides an improved assembly. While the preferred embodiments have been disclosed above, it should be readily apparent to those skilled in the art that a number of modifications and changes may be made without departing from the spirit and the scope of the invention. For example, while a reed valve has been disclosed in conjunction with the device, other types of valves could be employed such as spring loaded valves or duckbill valve. Alternatively, the bypass feature could be eliminated. Also, the specific materials mentioned are not the only materials which can be used. In addition, other geometric configurations could be used in place of the serpentine pathway.

We claim:

1. An oil cooling device for use with an internal combustion engine, comprising:
   an air coolable body member adapted to be placed between an oil filter and a wall of an internal combustion engine, the body member including a cooling section and a connecting section, the connecting section being for connection to the engine wall on one side and the oil filter on another side; and
   fluid feed and return passages disposed internally in the connecting and cooling sections, the fluid feed passage adapted to be connected to an oil outlet port of the engine wall, and the return passage adapted to be connected to the oil filter, the oil cooling device characterized by the absence of external feed and return lines.

2. The device of claim 1, wherein the body member is a single piece body.

3. The device of claim 2, wherein the cooling section has externally extending fin members to permit the movement of cooling air thereover, and at least one of said passages is serpentine in the cooling section.

4. The device of claim 1, wherein the body member has a paddle shaped configuration, with the connecting section being in the shape of a paddle handle.

5. The device of claim 1, wherein the device also comprises the oil filter and the oil filter is connected to an oil intake port of the engine by a nipple member extending through the connecting section.

6. An oil filtering and cooling device for use with an internal combustion engine, comprising:
   an oil filter;
   a cooling body member adapted to be placed between the oil filter and a wall of an internal combustion engine, the cooling body member including a cooling section and a connecting section, the connecting section being for connection to the engine wall on one side and the oil filter on another side;

fluid feed and return passages disposed internally in the connecting and cooling sections, the fluid feed passage adapted to be connected to an oil outlet port of the engine wall and the return passage adapted to be connected to the oil filter;

a bypass port through the cooling body connecting section extending to permit, under certain oil pressure conditions, direct flow from the oil outlet port to the filter; and a pressure activated valve operatively associated with the bypass port to inhibit passage of lower pressure oil through the bypass port while permitting greater flow of oil through the bypass port when high pressure oil is present at the valve, the oil cooling device characterized by the absence of external feed and return lines.

7. The device of claim 6, wherein the valve is a reed valve attached to a side of the connecting section.

8. The device of claim 6, wherein the oil filter is adapted to be connected to an oil intake port of the engine by a passage extending through a central region of the connecting section, and a return passage and bypass port in the connecting section are offset therefrom.

9. The device of claim 6, wherein the cooling section and the connecting section are formed as a one piece body.

10. The device of claim 9, wherein the cooling section and the connecting sections are formed from cast aluminum and the cooling section has externally extending cooling fins.

11. An oil cooling device for use with an internal combustion engine, comprising:

an air coolable body member connectable between an oil filter and a wall of an internal combustion engine, the cooling body member including a cooling section and a connecting section, the connecting section being for connection to the engine wall on one side and the oil filter on another side; and fluid feed and a return passages disposed internally in the connecting and cooling sections, the fluid feed passage being connectable to an oil outlet port of the engine wall and the return passage being connectable to the oil filter, with the oil filter then being capable of being in fluid communication with an oil intake port of the engine by means of a direct line passage through the connecting section, the oil cooling device characterized by the absence of external feed and return lines.

12. The device of claim 11, wherein the device further comprises the oil filter and the connecting section includes a bypass port extending between the fluid feed passage in the connecting section and the oil filter and the device further includes a pressure activated valve operatively positioned between the bypass port and the oil filter to allow the passage of high pressure oil through the bypass port and into the filter but to restrict the bypass port in the presence of lower pressure oil.

13. The device of claim 12, wherein the valve is a reed valve.

* * * * *